United States Patent [19]

Becker et al.

[11] Patent Number: 5,165,326
[45] Date of Patent: Nov. 24, 1992

[54] SUPPLY SYSTEMS FOR TOWER-TYPE MALTHOUSES

[75] Inventors: Karl L. Becker; Francesco Beldevere, both of Madrid, Spain

[73] Assignees: Seeger Industrial, S.A., Madrid, Spain; Inamex de Cerveza y Malta, S.A. de C.V., Texoco, Mexico

[21] Appl. No.: 676,768

[22] Filed: Mar. 27, 1991

[30] Foreign Application Priority Data

Apr. 5, 1990 [ES] Spain ............................ 9000990

[51] Int. Cl.⁵ .......................... C12C 1/14; C12C 1/06
[52] U.S. Cl. .............................. 99/277.2; 435/304; 435/305
[58] Field of Search ............ 99/276, 277, 277.1, 99/277.2, 278; 435/304, 305, 306, 307; 212/134, 135, 205; 187/15, 22, 94

[56] References Cited

U.S. PATENT DOCUMENTS

| | | | |
|---|---|---|---|
| 1,470,780 | 10/1923 | Thallmayer | 187/94 |
| 4,226,404 | 10/1980 | Zens | 187/94 |
| 4,773,312 | 9/1988 | Herberg et al. | 99/277.2 |
| 5,036,954 | 8/1991 | Haahtikivi et al. | 187/94 |

FOREIGN PATENT DOCUMENTS 1538177 1/1979 United Kingdom .................. 99/276

Primary Examiner—Harvey C. Hornsby
Assistant Examiner—Reginald L. Alexander
Attorney, Agent, or Firm—McAulay Fisher Nissen Goldberg & Kiel

[57] ABSTRACT

A tower-type malthouse is disclosed having a central column about which an arm rotates for performing selected operations. A sleeve is coupled to the arm for rotation therewith. The sleeve has a plurality of grooves, each of which fixedly receives one end of a separate duct or cable for carrying electrical current or fluids to the arm for performing the selected operations. The duct or cable is wound up in the groove and unwound therefrom depending on the directional rotation of the arm. Each duct or cable is engageable with a set of pulleys, and a counterweight is connected to one of the pulleys in the set to maintain the duct or cable under tension. The counterweight takes up the differences of lengths of the duct or cable as it is wound or unwound in the groove of the sleeve dependent upon the directional rotation of the arm.

4 Claims, 3 Drawing Sheets

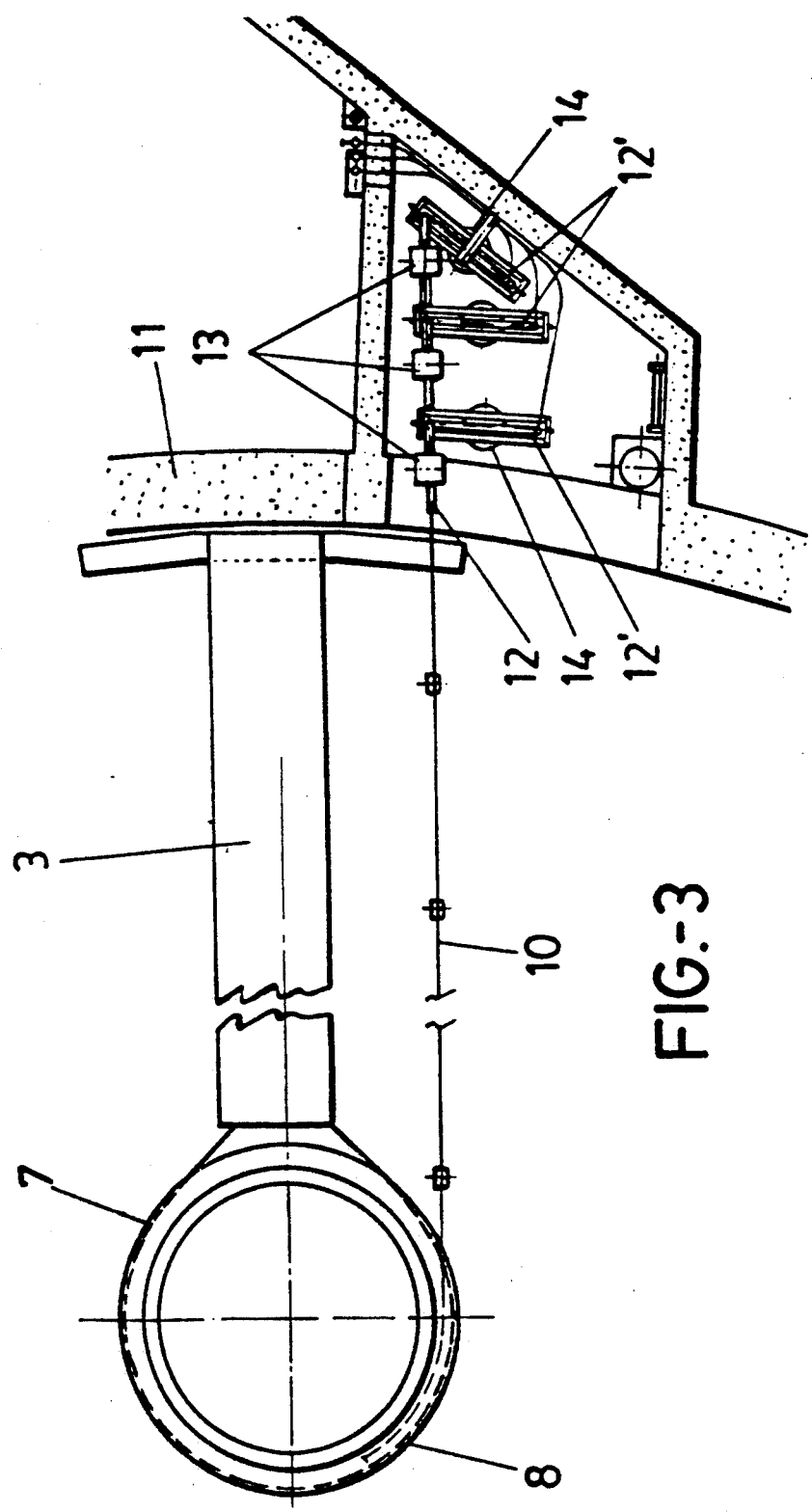

SUPPLY SYSTEMS FOR TOWER-TYPE MALTHOUSES

DESCRIPTION

SUBJECT OF THE INVENTION

The present invention relates to a system which has been specially designed for the electrical, water and/or any other type supply to the machine-arm which rotates on the corresponding central column in each one of the floorage areas of a tower-type malthouse.

BACKGROUND OF THE INVENTION

As is known, in tower-type malthouses a plurality of superposed floorage areas is installed, in particular one or more upper steeping floorage areas, one or more intermediate germination floorage areas and one or more lower roasting floorage areas, there being in each one of these floorage areas a machine-arm equipped with an endless belt for the adequate spreading of the product and later collection of same, as well as stirring means; the said arm rotates on a central column and is to be supplied as much with electrical current for the previously mentioned operating elements as with water at normal pressure for humidification of the product and with water at high pressure for cleansing, as well as with compressed air also.

When dealing with tower-malthouses of considerable diameter the central column not only has the function of operating as rotation axis for the various machine-arms installed in the various floorage areas of the malthouse, but in addition must constitute a strong element for supporting the flooring units of the building with the purpose of minimizing the costs of the latter, the reason why the said column is of considerable diameter.

In such cases the said column constitutes a significant obstacle for the supply ducts of cables of the machine-arm.

In an attempt to obviate this problem area malthouses are known in which the machine-arm is fixed, the base of each floorage area being rotatory, but this solution is not economical due to the large amount of weight which it is required to move, since in the loaded condition the said rotatory base may attain and even exceed seven hundred tonnes.

The other solution, in which the base is fixed and it is the machine-arm which moves, consists in installing in the roof of each floorage area a helical track with wheeled rollers for retracting the cable, but this solution is very costly, not aesthetic and has frequent problems of blockage of the rollers due to the curvature of the guide.

Neither, from the point of view of the electrical supply, is the conventional system of brushes suitable due to the large diameter of the column, which may come to attain three meters, since the mechanics of tracks with this diameter for the brushes would be exceedingly complicated and very costly while at the same time the block would be difficult to encapsulate for suitably sealing and protecting such means of connection.

DESCRIPTION OF THE INVENTION

The supply system which the invention proposes for tower-type malthouses in which the base of each floorage area is fixed, it being the machine-arm which rotates, consists in coupling to the conventional ring through which the machine-arm rotates on the central column of the floorage area, a sleeve provided with a plurality of perimetric channels coinciding in number with the cables and ducts which are to have access to the said machine-arm, cables and ducts which emerge tangentially from the said sleeve so as to reach, in an approximately radial arrangement, the lateral wall of the malthouse beyond which each one of them connects with its corresponding supply line having passed through a set of pulleys, one of them provided with a tightening element of the duct so as to take up the differences of length which it presents to the point of connection to the line as it winds up in its corresponding groove of the sleeve or unwinds from the same depending on the direction of rotation of the machine-arm; the set of pulleys may consist of a fixed pulley after which, in the duct, it descends and ascends once more to the point of connection with the line, thus forming a loop in the turning point of which there is a second pulley provided with a counterweight, which pulley rises and falls as the loop lengthens or shortens.

It comes about in this way that when the machine-arm rotates in a specific direction the cables and ducts coil up on the said sleeve at the expense of a shortening of the loops set up at the other end of such cables and ducts, whilst when the machine-arm rotates in the opposite direction an uncoiling of such cables and ducts occurs, which automatically taken up by the said loops, in particular through the effect of the counterweights which assist them.

Additionally, as another of the characteristics of the invention and optionally, provision has been made for the said cables and ducts to be able to be assisted by cables of steel or similar which constitute the actual elements which resist the tensions exerted by the counterweights.

DESCRIPTION OF THE DRAWINGS

In order to complement the description of the invention and with the aim of helping a better understanding of the characteristics of the same, there is attached to the present descriptive document, as an integral part of the same, a set of drawings in which, by way of nonlimiting example, the following is represented:

FIG. 3. shows, finally, a plan view of the assembly represented in the previous figure.

PREFERRED EMBODIMENT OF THE INVENTION

Figure 1:
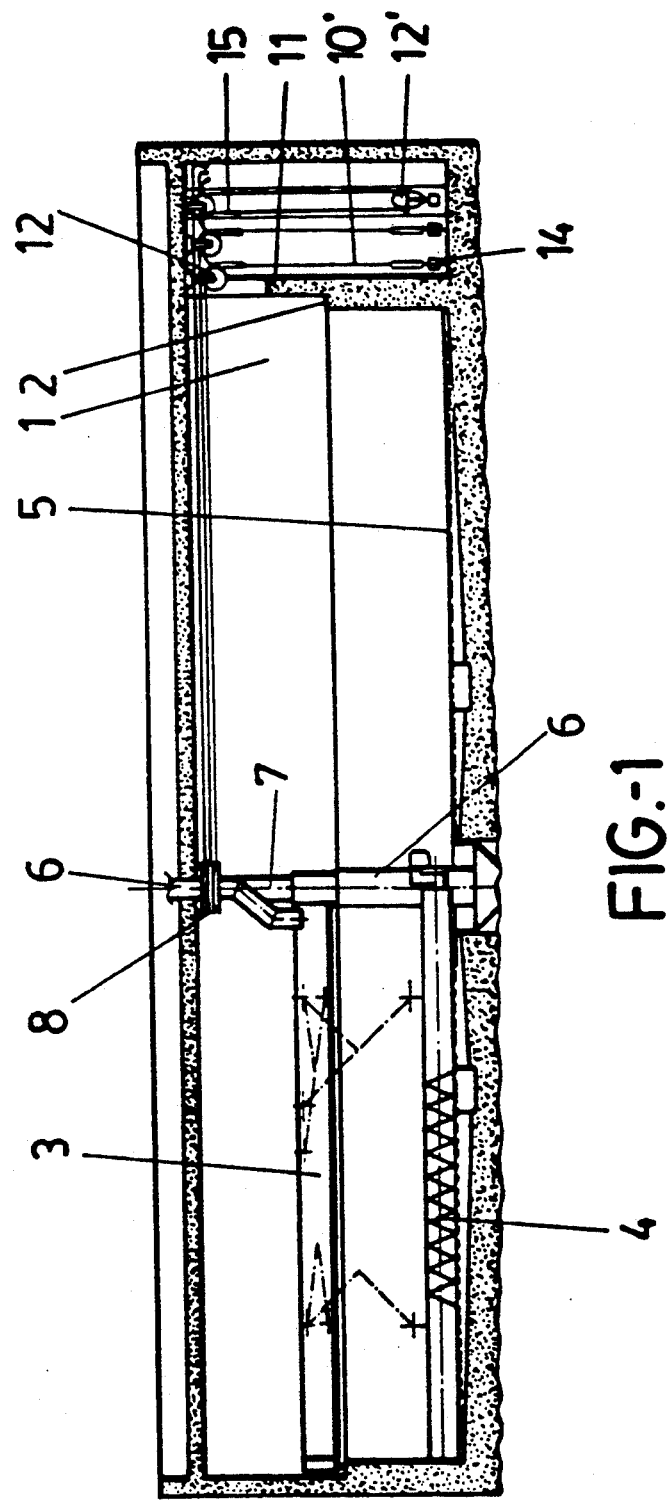
FIG. 1. shows a schematic representation in side elevation and in cross-section of part of a tower-type malthouse, in particular of one of the floorage areas of the same, equipped with the supply system which constitutes the subject of the present invention.

On regarding these figures it can be seen how the advocated supply system is applicable to tower-type malthouses in which there is installed a plurality of superposed circular floorage areas (1), in the lateral wall of which is provided a notching (2) for supporting the machine-arm (3) which, with the aid of the corresponding endless belt (4) is charged with spreading and collecting the material on the base or surface (5) of the said floorage area. The said machine-arm rotates on a central column (6) of considerable diameter which operates as axis for the same through a ring (7), electrical supply cables for the various moving elements in the same having access to the rotatory machine-arm (3), as well as ducts for water and compressed air for operations of humidification of the product and cleansing of the installation, which hereinafter we will refer to as ducts.

Figure 2:
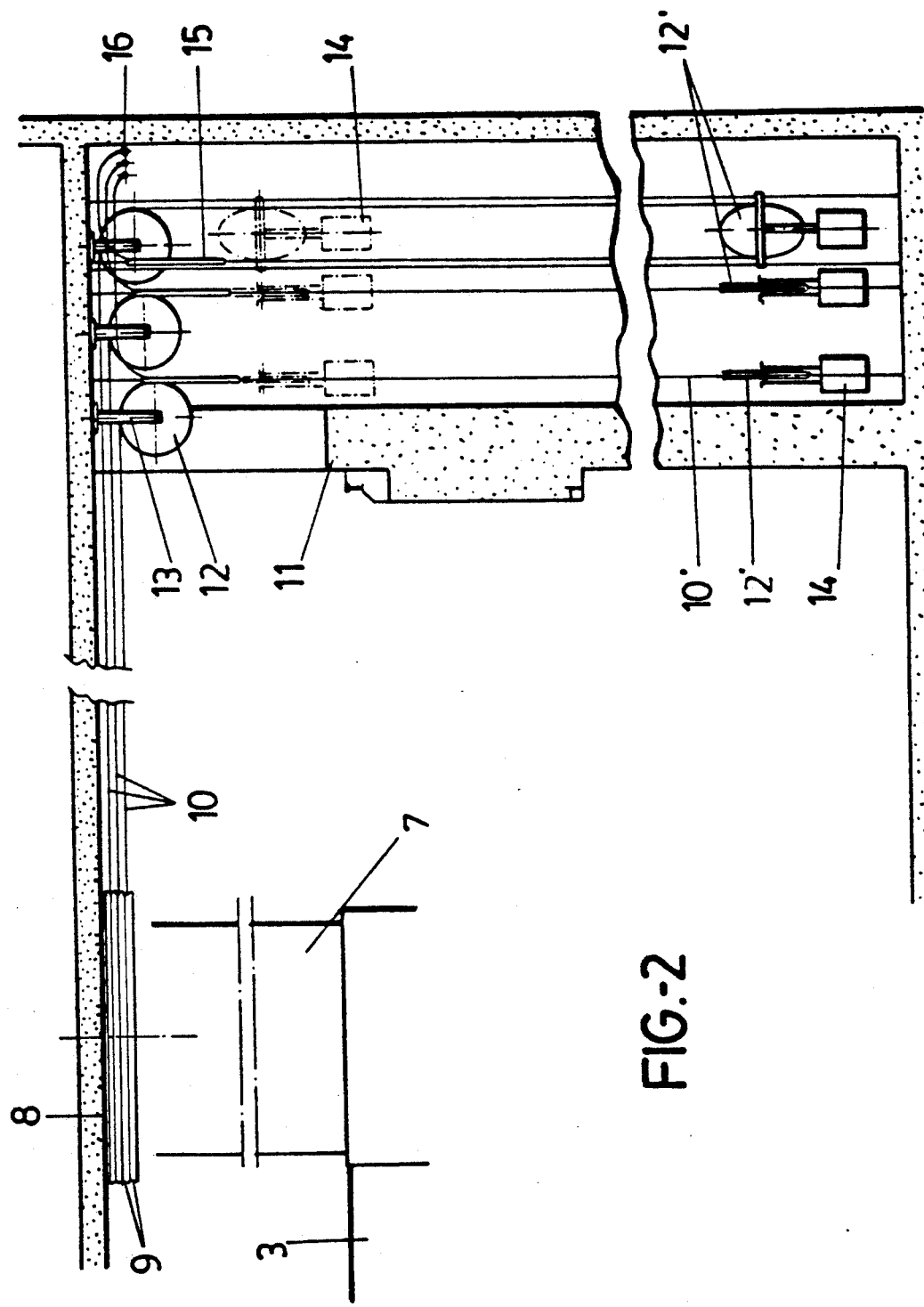
FIG. 2. shows an enlarged detail, also in side elevation, of the same supply system isolated from the rest of the assembly.

Now, as can be appreciated in FIGS. 1 and 2, on the basis of this basic construction for the malthouse the advocated supply system is based on the coupling to the movable ring (7) linked up to the machine-arm (3), of a sleeve (8) provided with a plurality of grooves (9) on its periphery which confer the shape of a multiple pulley to the said sleeve, the number of the grooves (9), as well as the dimensions thereof, being adequate for the number and dimensions of the ducts (10) which are to have access to the machine-arm (3) for the necessary supply of the same.

These ducts (10) emerge tangentially from the sleeve (8) as is seen in particular in FIG. 3 and, in a substantially radial arrangement, extend until they pass beyond the lateral wall (11) of the malthouse where the said ducts undergo a downward turn with the aid of respective pulleys (12) mounted on supports (13). These ducts (10) fold over themselves configuring loops (10') under second pulleys (12') from which hang respective counterweights (14) which tend to maintain these ducts suitably tensioned between the end thereof linked up and fixed to the sleeve (8) and the other end thereof, strengthened at (15) immediately before connection (16) thereof to the general access line of the relevant floorage area of the malthouse.

According to this construction and as has previously been stated, given that the machine-arm (3) carries out alternate 360° rotatory movements, when it rotates in one direction a "taking up" occurs of cables and ducts (10) which wind up on the grooves (9) of the sleeve (8) with the consequent shortening of the loops (10') and raising of the counterweights (14), whilst when the machine-arm (3) rotates in the opposite direction an unwinding occurs of the said cables and ducts (10) from the sleeve (8), and unwinding which is automatically taken up by the loops (10') through the effect of the said counterweights (14).

As has previously been stated and although not represented in the drawings, each one of these cables and/or ducts (10) may be assisted by a steel cable which constitutes the actual strong element which supports the mechanical traction of the said counterweights (14) without such forces being transmitted to the electrical cables or, where relevant, to the ducts for air or water.

It is not considered necessary to make this description more extensive in order for anybody skilled in the art to understand the scope of the invention and the advantages which derive from same.

The materials, form, size and arrangement of the elements will be susceptible to variation, only insofar as this does not entail any alteration in the essential nature of the invention.

The terms in which this document has been described are always to be taken in a wide and nonlimiting sense.

We claim:

1. In a tower-type malthouse having floorage areas for steeping, germination and/or roasting of a product, a central column in said malthouse, an arm having a ring rotatably mounted on said column to permit said arm to rotate about said column in alternate directions, and means carried by said arm for performing selected operations on the product, wherein the improvement comprises:

a sleeve coupled to said ring for rotation therewith conjointly with rotation of said arm, said sleeve having an outer surface formed with a plurality of grooves;

a plurality of ducts and/or cables connected to said sleeve for respectively carrying electrical current and fluids to said arm for performing the selected operations, each of said grooves being configured to fixedly receive therein the end of a separate one of said ducts or cables and to permit said duct or cable to be wound up in its associated groove and unwound therefrom depending on the directional rotation of said arm, the opposite end of each of said separate ducts and/or cables adapted to be connected to an associated supply source;

a plurality of sets of pulleys supported in said malthouse, each of said ducts or cables engageable with a separate set of said sets of pulleys; and a counterweight connected to one of the pulleys in each set of said sets of pulleys to maintain said ducts and/or cables under tension, said counterweights serving to take up the differences of lengths of said ducts and/or cables as they are wound or unwound in the respective grooves of said sleeve dependent upon the directional rotation of said arm.

2. The tower-type malthouse of claim 1, wherein each of said sets of pulleys has one pulley fixed in position and a second pulley movable relative to said fixed pulley, the duct or cable associated with a set of pulleys forming a loop toward the point of connection with its associated supply source, and the associated counterweight being connected to said movable pulley, said second pulley being movable to positions toward and away from said fixed pulley as said loop shortens or lengthens dependent upon the extent to which said duct and/or cable is wound or unwound in the associated groove of said sleeve upon rotation of said arm.

3. The tower-type malthouse of claim 1, wherein said malthouse includes a wall having at least one opening to permit passage of portions of said ducts and/or cables therethrough outside of said floorage areas, and said pulleys being supported in said malthouse outside of said floorage areas.

4. The tower-type malthouse of claim 1, further comprising a steel cable operatively coupled to each of said ducts and cables over their movable range, the counterweight associated with said duct or cable being connected to the associated steel cables.

* * * * *